(12) United States Patent
Nakamura (10) Patent No.: US 8,265,561 B2
(45) Date of Patent: Sep. 11, 2012

(54) RADIO COMMUNICATION APPARATUS AND INTERFERENCE REMOVING METHOD

(75) Inventor: Tadashi Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 381 days.

(21) Appl. No.: 12/399,253

(22) Filed: Mar. 6, 2009

(65) Prior Publication Data

US 2009/0233555 A1    Sep. 17, 2009

(30) Foreign Application Priority Data

Mar. 14, 2008   (JP) .................................. 2008-066045

(51) Int. Cl.
*H04B 15/00* (2006.01)
(52) U.S. Cl. .................................. 455/63.1; 455/67.13
(58) Field of Classification Search ............ 455/63, 455/570, 297, 63.1, 67.13; 375/285, 346
See application file for complete search history.

(56) References Cited

U.S. PATENT DOCUMENTS

| | | | |
|---|---|---|---|
| 4,525,870 A | 6/1985 | Fukuhara et al. | |
| 5,930,726 A | 7/1999 | Fujita | |
| 6,795,392 B1 * | 9/2004 | Li et al. .................... | 370/210 |
| 6,825,804 B1 * | 11/2004 | Doty ........................ | 342/357.59 |
| 6,985,709 B2 * | 1/2006 | Perets ....................... | 455/266 |
| 7,123,676 B2 * | 10/2006 | Gebara et al. ............. | 375/364 |
| 7,203,178 B2 * | 4/2007 | Ishii et al. ................. | 370/286 |
| 7,373,129 B2 * | 5/2008 | Fukuda et al. ............ | 455/296 |
| 2004/0028157 A1 * | 2/2004 | Aoki et al. ................ | 375/347 |

FOREIGN PATENT DOCUMENTS

| | | |
|---|---|---|
| JP | 58-92116 | 6/1983 |
| JP | 9-200107 | 7/1997 |
| JP | 2001-4736 | 1/2001 |
| JP | 2001-24619 | 1/2001 |
| JP | 2004-64563 | 2/2004 |
| WO | 2004/012441 | 2/2004 |

OTHER PUBLICATIONS

Notification of Reason for Refusal dated Mar. 6, 2012, from corresponding Japanese Application No. 2008-066045.

* cited by examiner

*Primary Examiner* — Dinh Le
(74) *Attorney, Agent, or Firm* — Katten Muchin Rosenman LLP (57) ABSTRACT

A radio communication apparatus having a first antenna and a second antenna, includes an interference estimation unit configured to estimate, using a signal of a second frequency band received by the second antenna, an interference component in the second frequency band contained in a signal of a first frequency band, and an interference removing unit configured to remove, based on information on the interference component estimated by the interference estimation unit, the interference component in the second frequency band contained in the signal of the first frequency band received by the first antenna.

8 Claims, 8 Drawing Sheets

RADIO COMMUNICATION APPARATUS AND INTERFERENCE REMOVING METHOD

CROSS-REFERENCE TO RELATED APPLICATIONS

This application is based upon and claims the benefit of priority of the prior Japanese Patent Application No. 2008-66045, filed on Mar. 14, 2008, the entire contents of which are incorporated herein by reference.

BACKGROUND OF THE INVENTION

The present invention relates to a radio communication apparatus and an interference removing method for reducing the signal interference by the radio communication in adjacent-frequency bands.

In radio communication, assuming that an adjacent-frequency band (hereinafter referred to as the adjacent channel) exists in the neighborhood of the desired radio frequency band (hereinafter referred to as the desired channel), the adjacent-channel interference occurs in which the desired channel signal is interfered with due to the leakage of the adjacent channel.

The adjacent-channel interference causes deteriorated reception sensitivity of a receiver, resulting in a deteriorated transmission quality.

In view of this, Japanese Laid-open Patent Publication No. 2001-24619, for example, discloses a technique for an OFDM (Orthogonal Frequency Division Multiplexing) transmission system to achieve a satisfactory reception characteristic of a radio communication apparatus in the desired channel by appropriately controlling the gain of the received signal after A/D conversion and thus suppressing the deterioration of the reception quality due to the adjacent-channel interference.

In the conventional technique described above, however, the interference component of the adjacent-channel is not removed by the radio communication apparatus.

SUMMARY OF THE INVENTION

According to an aspect of the invention, a radio communication apparatus including a first antenna and a second antenna, includes an interference estimation unit configured to estimate, using a signal of a second frequency band received by the second antenna, an interference component in the second frequency band contained in a signal of a first frequency band, and an interference removing unit configured to remove, based on information on the interference component estimated by the interference estimation unit, the interference component in the second frequency band contained in the signal of the first frequency band received by the first antenna.

According to an aspect of the invention, an interference removing method for a radio communication apparatus including a first antenna and a second antenna, includes estimating an interference component in a second frequency band contained in a signal of a first frequency band, using a signal of the second frequency band received by the second antenna, and removing, based on information from the estimating, the interference component in the second frequency band contained in the signal of the first frequency band received by the first antenna.

According to an aspect of the invention, an automotive vehicle including a radio communication apparatus having a first antenna and a second antenna, the radio communication apparatus includes an interference estimation unit configured to estimate an interference component in a second frequency band contained in a signal of a first frequency band, using a signal of the second frequency band received by the second antenna; and an interference removing unit configured to remove the interference component in the second frequency band contained in a signal of the first frequency band received by the first antenna, based on information on the interference component estimated by the interference estimation unit.

The object and advantages of the invention will be realized and attained by the means of the elements and combinations particularly pointed out in the claims.

It is to be understood that both the foregoing general description and the following detailed description are exemplary and explanatory and are not restrictive of the inventive step of the invention, as claimed.

DESCRIPTION OF EMBODIMENTS

Embodiments of the invention are explained below with reference to the drawings.

(1) Outline of Embodiment

According to the embodiments, a radio communication apparatus may use two antennas including a first antenna and a second antenna.

The first and second antennas both receive a first frequency band signal (desired channel signal) and a second frequency band signal (adjacent-channel signal).

The radio communication apparatus estimates an interference component due to the second frequency band signal contained in the first frequency band signal using the second frequency band signal received through the second antenna.

The radio communication apparatus, based on the information on the estimated interference component, removes the interference component due to the second frequency band signal contained in the first frequency band signal received through the first antenna.

Therefore, the interference is removed and the deterioration of the transmission quality is reduced.

For example, the first antenna is installed outdoor and the second antenna indoor, so that the first frequency band signal transmitted from the outdoor antenna and the second frequency band signal transmitted from the indoor antenna are received through the two antennas.

(2) Signal Interference Between Different Radio Communication Systems

An example of the communication system to which the embodiments are effectively applicable is a communication system such as ITS (Intelligent Transport Systems).

ITS is a traffic system aimed at safety, smoothness and comfort in the traffic using an information communication technique. The introduction of ITS is expected to make it possible to support safe driving, optimize traffic control, and improve navigation, while at the same time solving various other problems in the road traffic society.

An automotive vehicle carrying the ITS as a communication system, for example, transmits and receives signals to and from vehicles running in the neighborhood (vehicle-to-vehicle communication) or to and from radio communication apparatuses installed on the nearby traffic signs and utility poles (road-to-vehicle communication).

The vehicle-to-vehicle or the road-to-vehicle communication explained above are examples of radio communication at a comparatively short distance, and therefore, the radio communication apparatus of the ITS mounted on the vehicle transmits and receives comparatively low level signals.

In a mobile unit radio communication system such as the portable telephone (hereinafter referred to as the mobile station), on the other hand, the mobile station communicates with a base station located at a remote place, and therefore transmits a signal of a comparatively high level on the assumption that the radio wave is attenuated.

In the case where the mobile unit radio communication system is located in the frequency band adjacent to the ITS communication frequency band, therefore, the ITS signal is liable to suffer a great interference (adjacent-channel interference) of the signal (especially, the UL (uplink) signal) of the mobile unit radio communication system.

Figure 1:
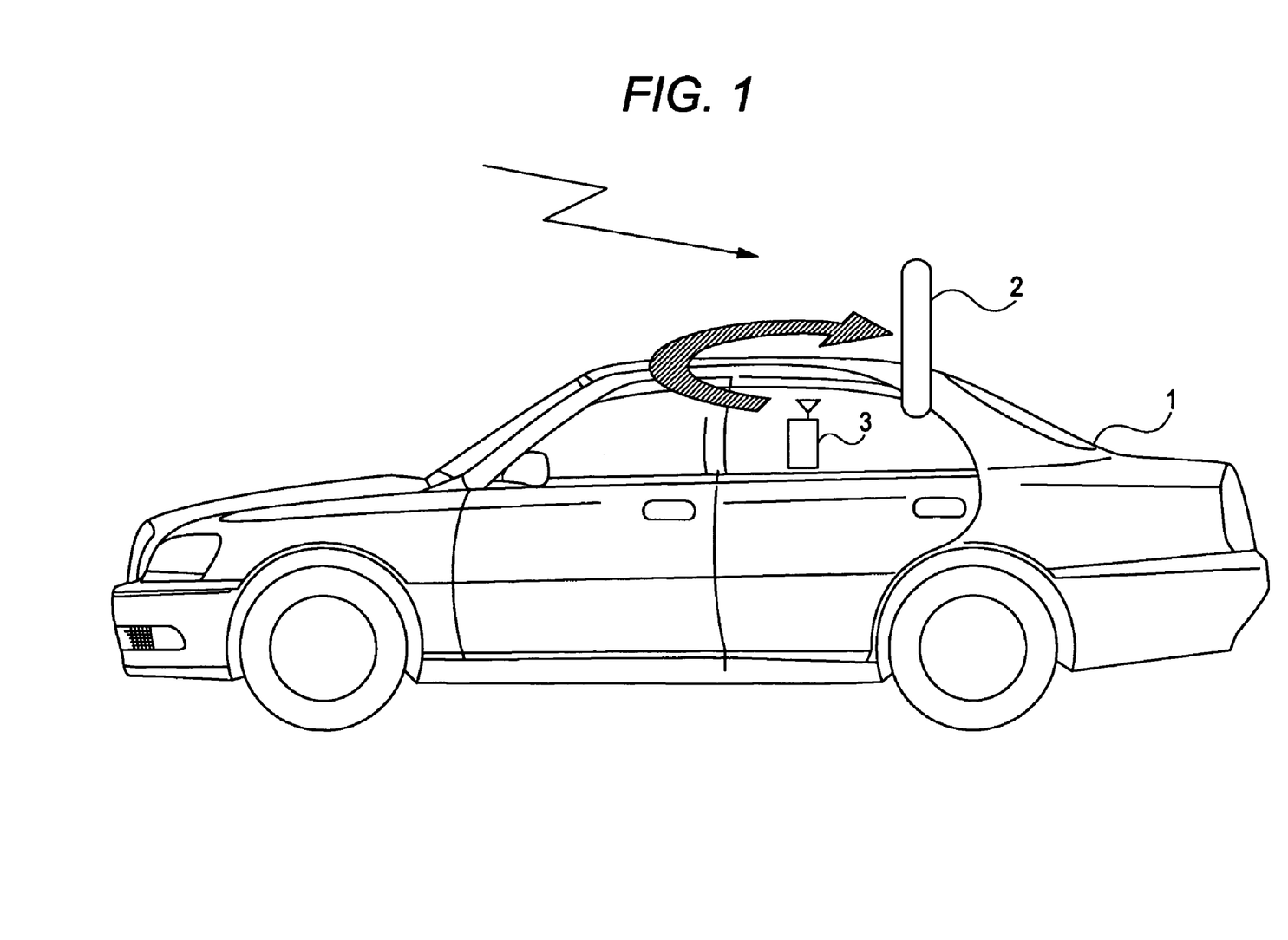
FIG. 1 depicts a specific example of a case in which a different radio communication system using an adjacent frequency band exists.

A specific example is illustrated in FIG. 1.

In FIG. 1, numeral 1 designates a vehicle carrying a communication system such as ITS, numeral 2 an antenna for the ITS, and numeral 3 a mobile station.

The vehicle 1 receives a signal from an antenna installed in the ITS (hereinafter referred to as the local system) installed on neighboring vehicles or infrastructure through the antenna 2.

In this situation, the radio communication may be conducted using the mobile station 3 in the vehicle 1.

An occupant of the vehicle, for example, may start operating the mobile station 3 to start communications using the mobile unit radio communication system (hereinafter referred to as the other system). Then, the antenna 2 receives also the signal of the other system at a high level from the antenna of the mobile station 3 located at a comparatively short distance.

As a result, the signal of the local system received by the antenna 2 is interfered with by the signal of the other system.

Figure 2:
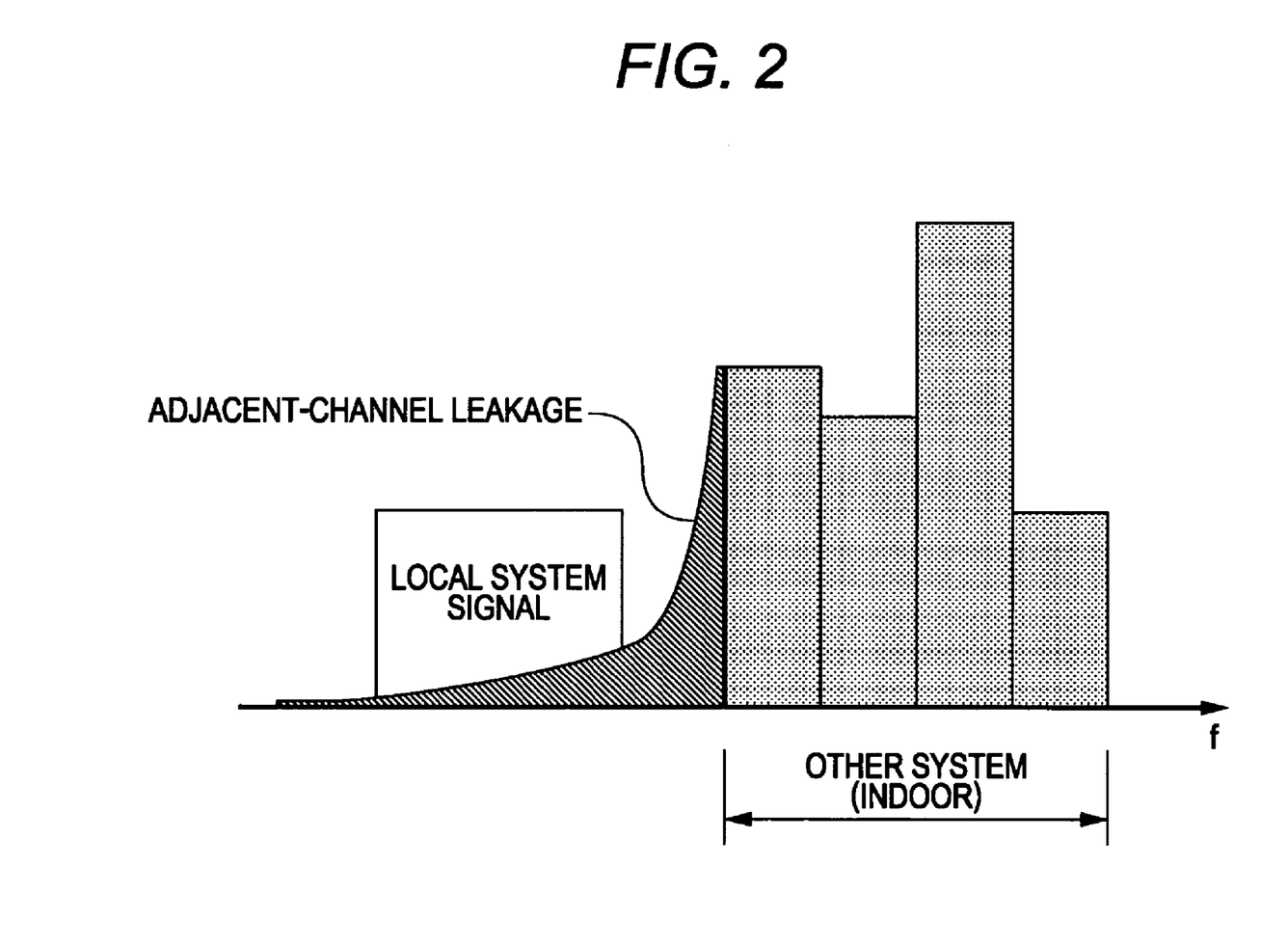
FIG. 2 depicts an example of the spectrum of a signal of a local system and other systems.

FIG. 2 depicts an example of the spectrum of the signals of the local system and the other system.

In FIG. 2, the hatched portion indicates the distortion component of the signal of the other system (adjacent-channel leakage), and the spectrum of the distortion component extends to the frequency band of the local system. This distortion component is mainly formed of a nonlinear distortion (tertiary distortion) caused in the RF amplifier or mixer at the time of signal modulation.

In the case where the signal level of the other system received by the antenna 2 is large, the signal level of the distortion component of the signal of the other system also increases to such an extent as to have an effect as an interference component on the signal of the local system.

Specifically, in the case of FIG. 1, the signal transmitted from the antenna of the mobile station 3 is so large a level at which it is received by the antenna 2 as to be considered to have a large effect of signal interference on the signal of the local system.

(3) Configuration of the Embodiments

Figure 3:
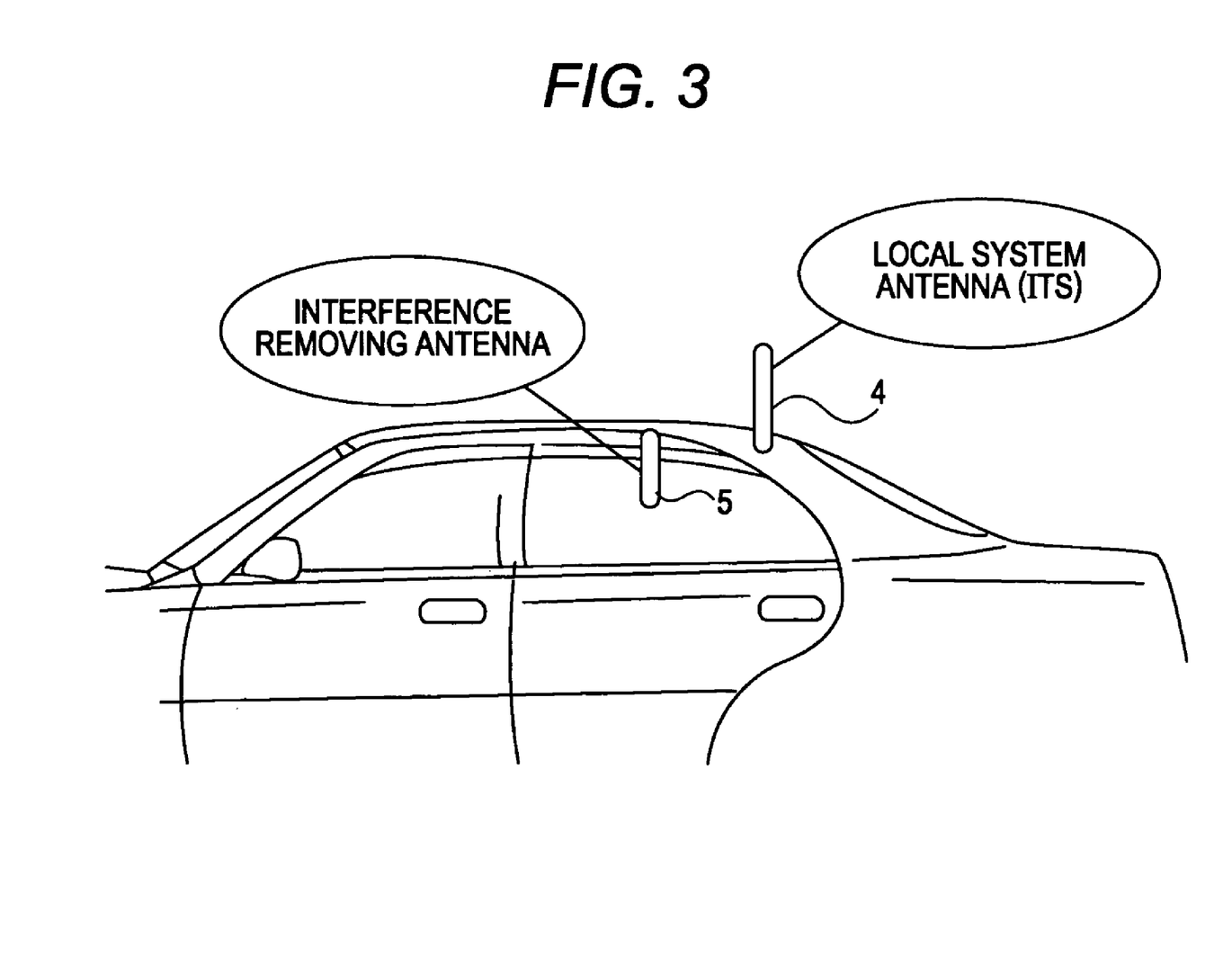
FIG. 3 depicts an example of an antenna arrangement according to an embodiment of the invention.

The embodiments use the two antennas illustrated in FIG. 3.

Specifically, the interference removing antenna 5 is installed in addition to the local system antenna 4.

Figure 4:
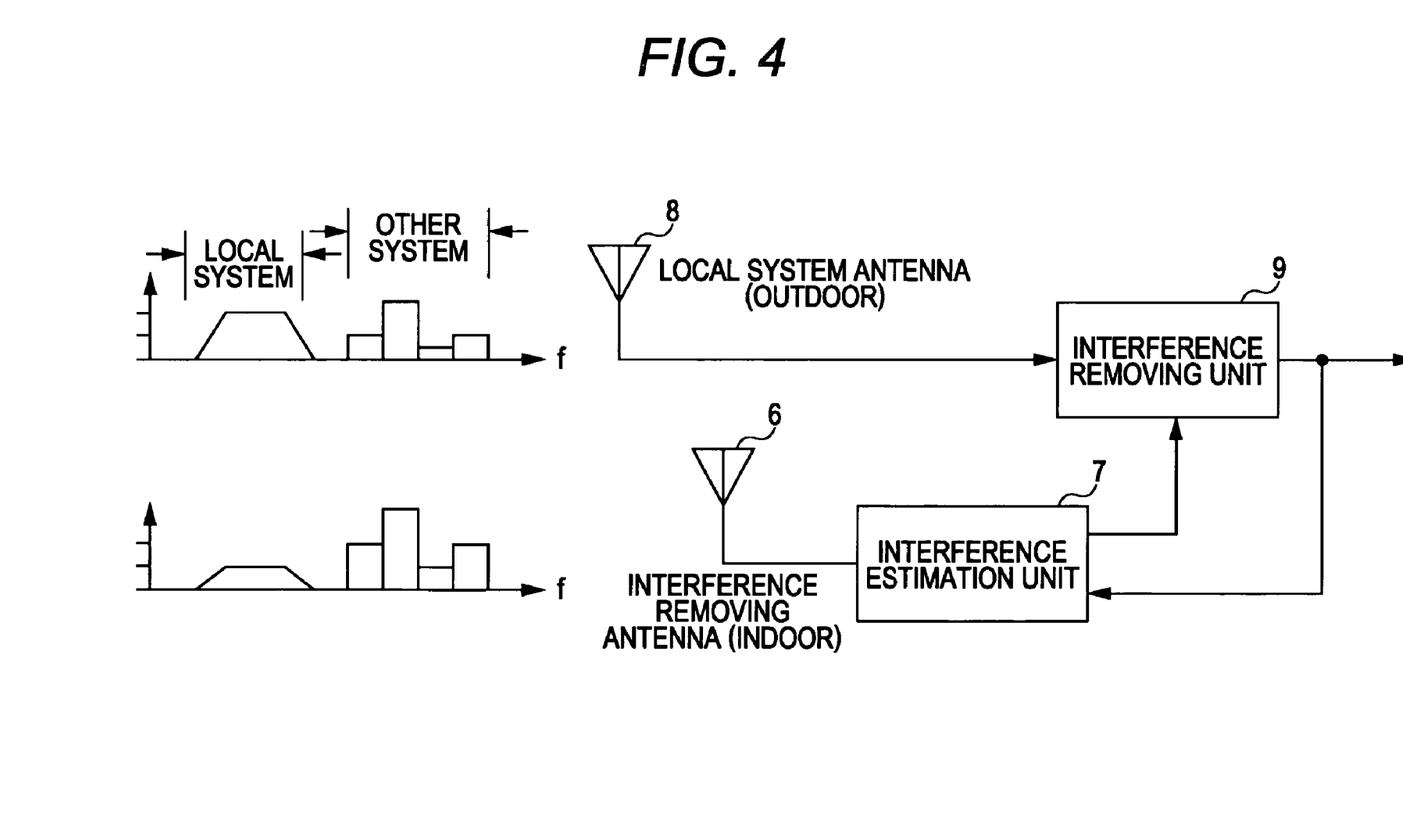
FIG. 4 depicts an example of a configuration according to an embodiment of the invention.

FIG. 4 is a diagram illustrating the system configuration according to the embodiments.

In FIG. 4, numeral 6 designates an interference removing antenna, numeral 7 an interference estimation unit, numeral 8 a local system antenna, and numeral 9 an interference removing unit.

The interference estimation unit 7 estimates the distortion component (interference component) of the signal of the other system in the frequency band of the signal of the local system using the signal of the other system received by the interference removing antenna 6, and sends out the estimation result as information to the interference removing unit 9.

The interference removing unit 9, based on the estimation result information sent from the interference estimation unit 7, removes the interference component contained in the signal of the local system received through the local system antenna 8.

Figure 5:
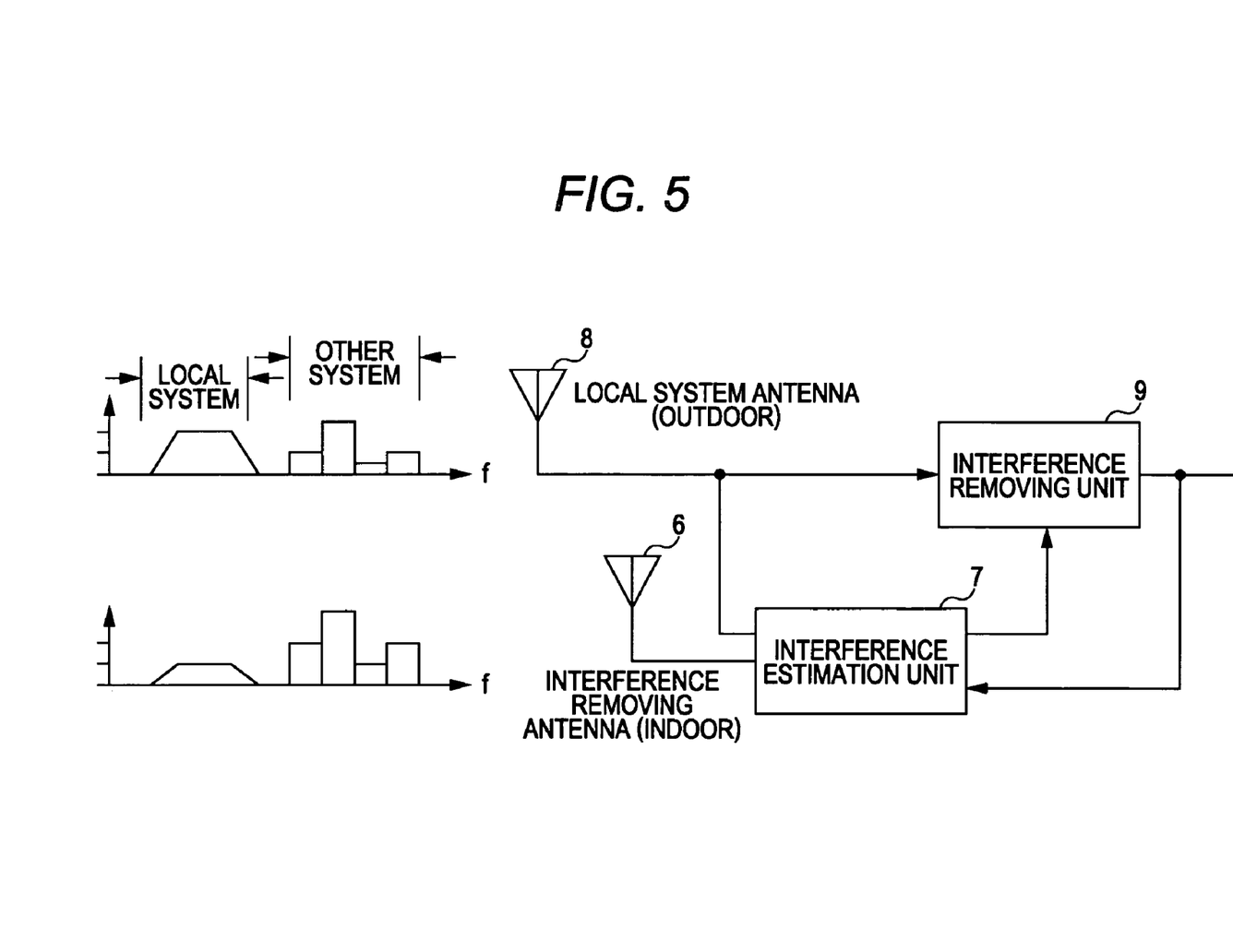
FIG. 5 depicts another example of a configuration according to an embodiment of the invention.

As illustrated in FIG. 5, the interference estimation unit 7 may be connected to the local system antenna 8.

Also, for example, according to the embodiments, the local system antenna is installed outdoor and the interference removing antenna indoor in relation to a vehicle 1.

The signal of the other system, when received by the interference removing antenna installed indoor, is not affected by radio wave run-around about the glass or vehicle body, and is, therefore, correspondingly high in reception intensity relative to the received signal of the local system.

In the radio communication apparatus, therefore, the interference component can be removed more accurately by estimating the distortion component using the signal of the other system received by the indoor antenna and higher in reception intensity.

Also, both the local system antenna and the interference removing antenna can be installed outdoor or indoor at a distance from each other. For example, the local system antenna may be installed on the roof, and the interference removing antenna at a position visible from indoor.

(4) First Embodiment

Figure 6:
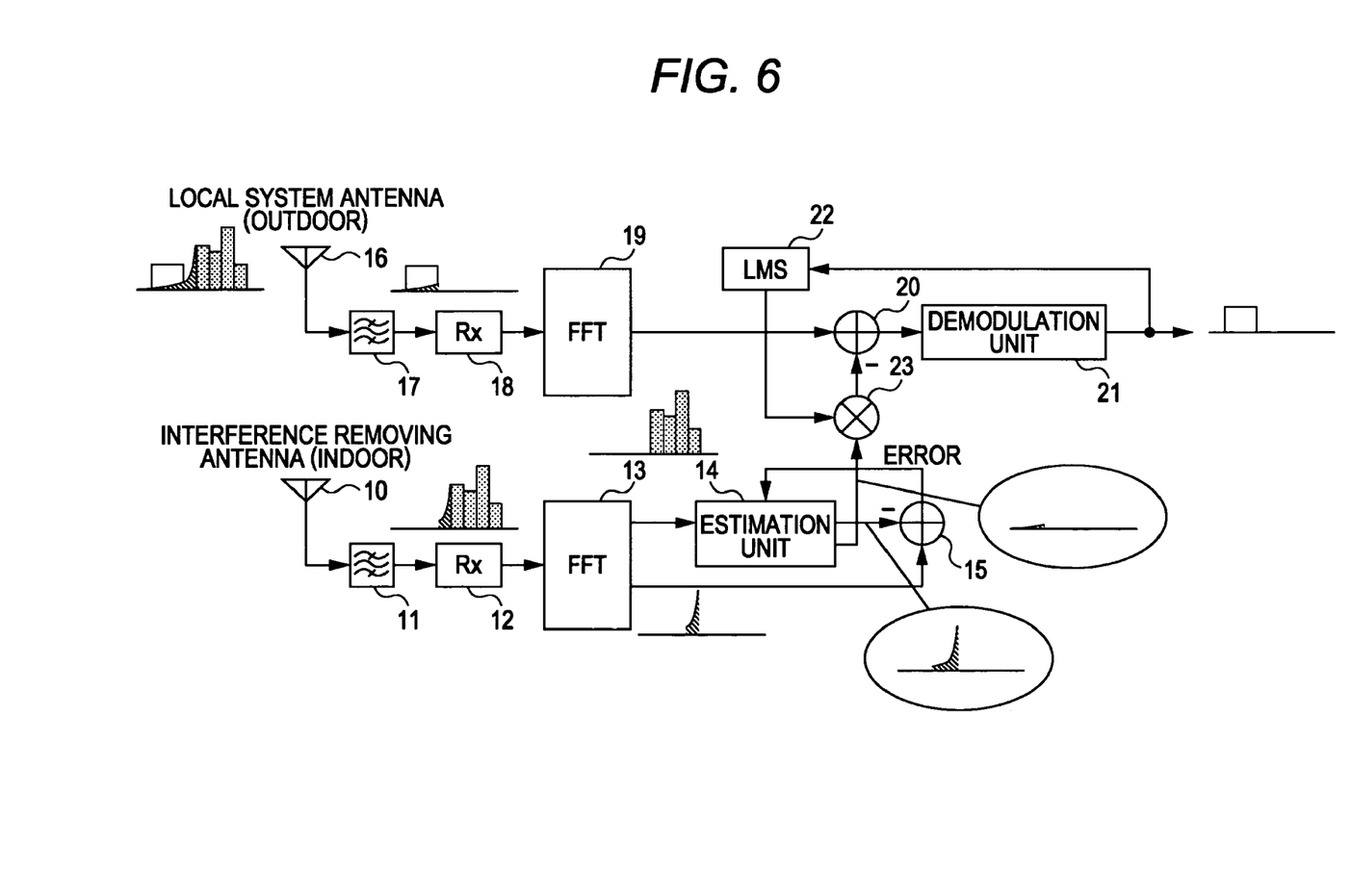
FIG. 6 depicts a process of removing interference of a received signal according to a first embodiment.

FIG. 6 is a diagram illustrating an interference removing process for a received signal according to the first embodiment.

In FIG. 6, numeral 10 designates an interference removing antenna, numerals 11, 17 bandpass filters, numerals 12, 18 reception processing units (Rx), numerals 13, 19 FTTs (fast Fourier transforms), numeral 14 an estimation unit, numerals 15, 20 adders, numeral 16 a local system antenna, numeral 21 a demodulation unit, numeral 22 an LMS (least mean square) unit, and numeral 23 a multiplier.

The interference removing antenna 10 receives a signal containing the signals of both the local system and the other system.

The bandpass filter 11 transmits a signal in the frequency band used by the other system signal from all the signals received by the interference removing antenna 10.

The reception processing unit 12 executes a reception process, such as down conversion, on the signal (RF signal) in the frequency band extracted by the bandpass filter 11.

The FFT 13 analyzes the input signal for each frequency component and separates the signal in accordance with the frequency band.

The FFT 13 sends the signal in the original frequency band of the other system to the estimation unit 14 and the signal in the frequency band of the distortion component of the other system signal to the adder 15.

The estimation unit 14 estimates the distortion component of the signal in the frequency band of the other system using the signal in the frequency band of the other system sent from the FFT 13.

The distortion component is estimated, for example, by the method described below.

Generally, the modulated signal can be expressed by the equation $$S(t)=A(I(t)\cos(\omega t+\phi)+jQ(t)\sin(\omega t+\phi)) \quad (1)$$

where $\phi$ is the phase distortion component.

The tertiary distortion which is a nonlinear distortion is a signal component proportional to $S^3(t)$, and therefore, Equation (1) can be simplified as $$(I(t)\cos(\omega t+\phi)+jQ(t)\sin(\omega t+\phi))^3 \quad (2)$$

Equation (2) is solved about the I-axis component (INL component) and the Q-axis component (QNL component) to obtain Equations (3) and (4), respectively.

$$INL=(I(t)\cos(\omega t+\phi)+jQ(t)\sin(\omega t+\phi))^3\times\cos(\omega t)=\tfrac{3}{8}((I^3(t)+I(t)Q^2(t))\cos\phi+(Q(t)I^2(t))\sin\phi) \quad (3)$$

$$QNL=(I(t)\cos(\omega t+\phi)+jQ(t)\sin(\omega t+\phi))^3\times\sin(\omega t)=\tfrac{3}{8}((Q^3(t)+Q(t)I^2(t))\cos\phi-(I(t)^3+I(t)Q^2(t))\sin\phi) \quad (4)$$

Specifically, the tertiary distortion component can be expressed by being separated into the distortion component along I axis and that along Q axis.

The estimation unit 14 generates the signal of the distortion component modeled by estimation as described above and sent to the adder 15 as an estimated value.

The adder 15 outputs the difference between the signal of the distortion component received from the FFT 13 and the estimated value of the distortion component received from the estimation unit 14, and sends the difference to the estimation unit 14 as the error information of the two signals.

The estimation unit 14 receives the error information from the adder 15 and generates an estimated value of the new distortion component corrected using the particular error information.

The above-mentioned correction at the estimation unit 14 may be carried out using LMS (Least Mean Square).

LMS is a representative algorithm of the minimum mean square error (MMSE).

Now, an example of the automatic correction of the distortion component by LMS is explained.

The correction is carried out in such a manner as to minimize the difference e(t) between the expectation value R(t), i.e. the distortion component of the signal actually received and the estimated value, i.e. the modeled distortion component.

Let x be an amplitude correction value, and the equations below hold.

$$|e(t)|=|R(t)-x(INL+JQNL)| \quad (5)$$

$$|e(t)|^2/dx=|R(t)-x(INL+JQNL)|^2/dx=-2e(t)(INL+JQNL) \quad (6)$$

Similarly, let $\phi$ be a phase correction value, and the equations below hold.

$$|e(t)|=|R(t)-x(INL+JQNL)| \quad (7)$$

$$|e(t)|^2/d\phi=|R(t)-x(INL+JQNL)|^2/d\phi=-2e(t)x(t) \quad (8)$$

Thus, the correction equations are given as $$x(t)=x(t-1)-\mu 2e(t)(INL+JQNL) \quad (9)$$

$$\phi(t)=\phi(t-1)-\mu 2e(t)x(t) \quad (10)$$

The estimation unit 14 sends to the multiplier 23 the signal in the frequency band of the local system signal (hereinafter referred to as the replica), of all the estimated distortion component signals generated.

The local system antenna 16 receives a signal containing the signals of both the local system and the other system.

The bandpass filter 17 extracts the signal contained in the frequency band of the local system out of the signals received by the local system antenna 16.

The reception processing unit 18 executes a reception process, such as down conversion, on the signal (RF signal) in the frequency band extracted by the bandpass filter 17.

The FFT 19 analyzes each frequency component of the input signal and sends the analyzed signal to the adder 20.

The demodulation unit 21 executes the demodulation process on the signal received from the adder 20.

The LMS unit 22 sends to the multiplier 23 the control information on the phase and amplitude of the signal output from the demodulation unit 21.

The multiplier 23, using the control information from the LMS unit 22, adjusts the phase and amplitude of the replica received from the estimation unit 14 and sends the adjusted replica to the adder 20.

The adder 20 subtracts the replica (i.e. adds the replica of inverse phase) adjusted by the multiplier 23 from the signal in the frequency band of the local system which is input from the FFT 19.

In the way described above, the distortion component of the signal of the other system making up the interference component is removed from the signal received by the antenna of the local system.

The signal received by the antenna of the local system, from which the distortion component is removed, may be processed as audio and video data, and output.

With regard to the signal of the other system received by the antenna for removing the interference component, the interference component is generated but data may or may not be output to the display unit.

(5) Second Embodiment

Figure 7:
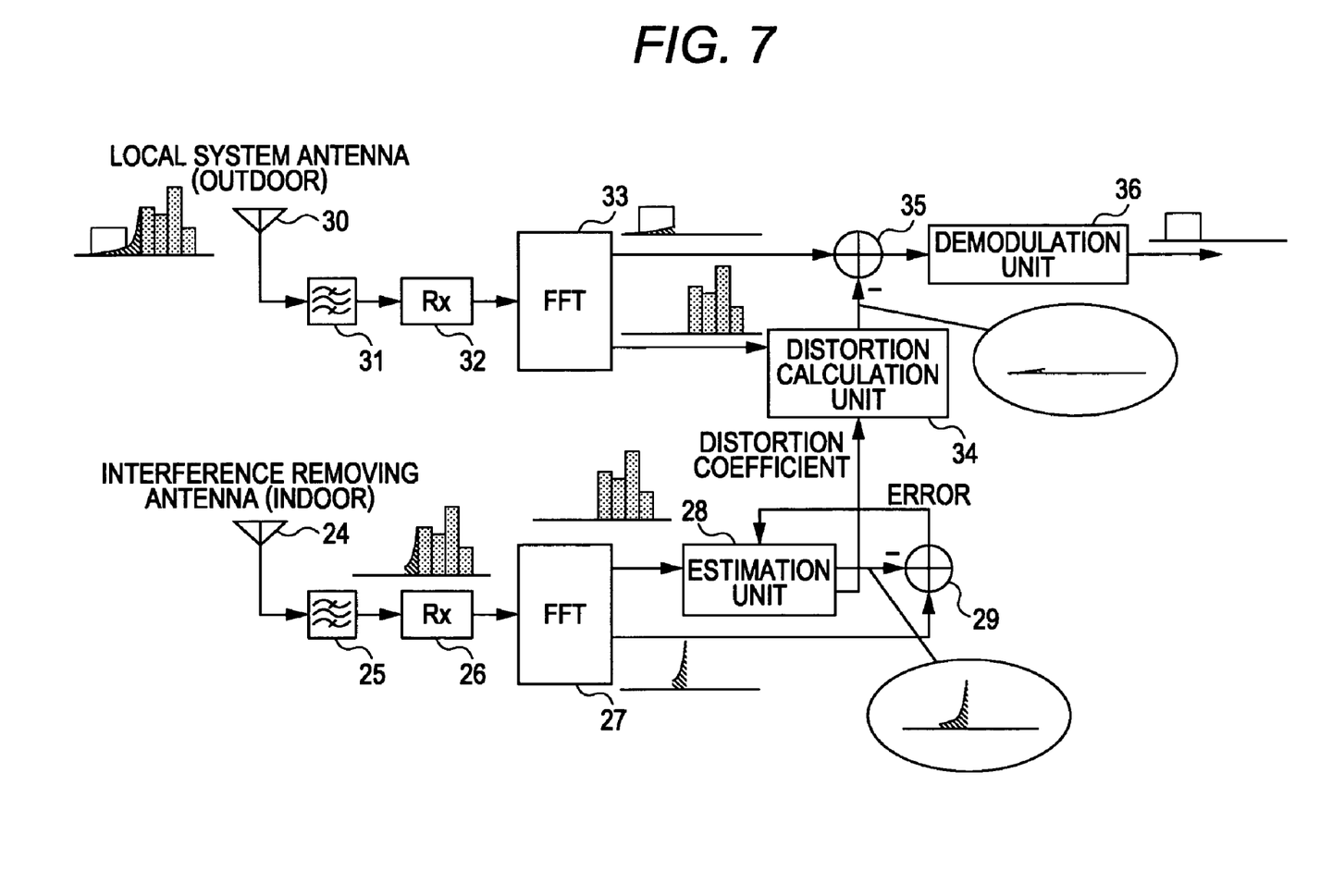
FIG. 7 depicts a process of removing interference of a received signal according to a second embodiment.

FIG. 7 is a diagram illustrating an interference removing process for a received signal according to the second embodiment.

In FIG. 7, numeral 24 designates an interference removing antenna, numerals 25, 31 bandpass filters, numerals 26, 32 reception processing units, numeral 27, 33 FFTs, numeral 28 an estimation unit, numerals 29, 35 adders, numeral 30 an antenna of the local system, numeral 34 a distortion calculation unit, and numeral 36 a demodulation unit.

The interference removing antenna 24 receives a signal containing signals of both the local system and the other system.

The bandpass filter 25 extracts the signal in the frequency band containing the signal of the other system from all the signals received by the interference removing antenna 24.

The reception processing unit 26 executes a reception process, such as down conversion, on the signal (RF signal) in the frequency band extracted by the bandpass filter 25.

The FFT 27 analyzes each frequency component of the input signal and separates the signal in accordance with the frequency band.

The FFT 27 sends the signal in the original frequency band of the other system to the estimation unit 28 and the signal in the frequency band of the distortion component contained in the particular other system signal to the adder 29.

The estimation unit 28 estimates the distortion component of the signal in the frequency band of the other system using the signal in the frequency band of the particular other system received from the FFT 27. The estimation is conducted, for example, in a similar manner to the first embodiment.

The estimation unit 28 generates the signal of the distortion component modeled by estimation and sends it as an estimated value to the adder 29.

The adder 29 outputs the difference between the distortion component signal received from the FFT 27 and the estimated value of the distortion component received from the estimation unit 28 and sends this difference to the estimation unit 28 as error information.

The estimation unit 28 generates a new estimated value of the distortion component corrected by use of the error information sent out from the adder 29. The correction may be carried out in accordance with the algorithm such as LMS or MMSE as in the first embodiment.

The estimation unit 28 reduces (or preferably minimizes) the signal intensity of the other system against the signal intensity of the local system based on the information of the phase correction value φ and the amplitude correction value x calculated in the correction described above. Specifically, such a weight (x, φ or a combination thereof) is calculated as to increase (or preferably maximize) the SINR (Signal-to-Interference plus Noise power Ratio) of the local system. The estimation unit 28 sends out this weight to the distortion calculation unit 34 as a distortion coefficient.

The local system antenna 30 receives the signal containing the signals of both the local system and the other system.

The bandpass filter 31 extracts the signal in the frequency band of the local system and the other system from the signals received by the antenna 24 of the local system.

The reception processing unit 32 executes a reception process, such as down conversion, on the signal (RF signal) in the frequency band extracted by the bandpass filter 31.

The FFT 33 analyzes each frequency component of the input signal and separates the signal in accordance with the frequency band.

The FFT 33 sends out the signal in the frequency band of the other system to the calculation unit 34 and the signal in the frequency band of the local system to the adder 35.

The distortion calculation unit 34 generates the signal of the modeled distortion component based on the signal of the other system received from the FFT 33 on the one hand and calculates the distortion component corrected using the distortion coefficient (phase, amplitude) received from the estimation unit 28 on the other hand.

The distortion calculation unit 34 sends to the adder 35 the component (hereinafter referred to as the replica) contained in the frequency band of the local system of all the calculated distortion components.

The replica received from the distortion calculation unit 34 is subtracted by the adder 35 from the signal in the frequency band of the local system received from the FFT 33, and the resulting signal is output to the demodulation unit 36.

The demodulation unit 36 executes the demodulation execution on the signal received from the adder 35.

In the way described above, the distortion component of the signal of the other system constituting the interference component is removed from the signal received by the antenna of the local system.

The signal which is received by the antenna of the local system and from which the distortion component is removed may be processed as audio and video data.

(6) Modification of Second Embodiment

Figure 8:
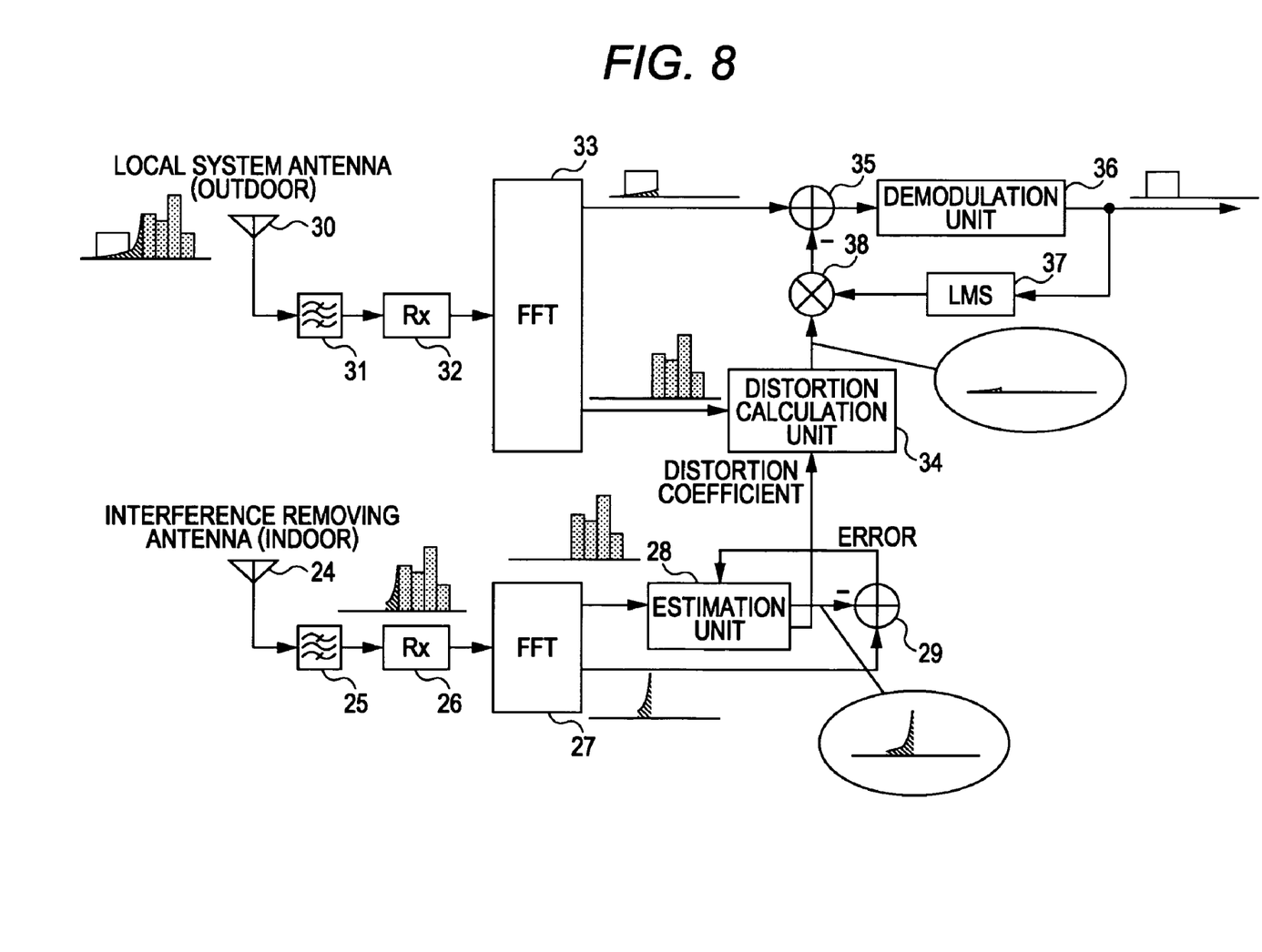
FIG. 8 depicts a process of removing interference of a received signal according to a modification of the second embodiment.

FIG. 8 is a diagram illustrating the interference removing process for the received signal according to a modification of the second embodiment.

In FIG. 8, numeral 37 designates an LMS unit, and numeral 38 a multiplier. The component parts included in both the second embodiment (FIG. 7) and this modification are designated by the same reference numerals, respectively, and not explained further.

The antenna 30 of the local system receives the signal containing the signals of both the local system and the other system.

The distortion calculation unit 34 sends the replica to the multiplier 38.

The replica received from the multiplier 38 is subtracted by the adder 35 from the signal in the frequency band of the local system received from the FFT 33, and the resulting signal is output to the demodulation unit 36.

The demodulation unit 36 executes the demodulation process on the signal received from the adder 35.

The LMS unit 37 sends to the multiplier 38 the control information on the phase and amplitude of the signal output from the demodulation unit 36.

The multiplier 38, using the control information received from the LMS unit 37, adjusts the phase and amplitude of the replica received from the distortion calculation unit 34, and sends the adjusted replica to the adder 35.

As a result, according to this embodiment, in addition to the effects of the second embodiment, the signal interference removal can be carried out taking the filter characteristic of the signal received by the antenna of the local system into consideration.

(7) Applications of the Embodiments

Applications of the embodiments are explained above with reference to an example in which the signal interference by the mobile unit communication system such as a cellar phone has an effect on the signal transmission and reception in the ITS. Nevertheless, the embodiments are also suitably applicable to the radio communication system such as the portable music player using Bluetooth which transmits and receives the signal on a comparatively weak radio wave.

The applications of the embodiments are not limited to the aforementioned examples but can find also with equal effect in the environment in which different radio communication systems are operated simultaneously using adjacent-frequency bands.

All examples and conditional language recited herein are intended for pedagogical purpose to aid the reader in understanding the invention and the concepts contributed by the inventor to furthering the art, and are to be construed as being without limitation to such specially recited examples and conditions, nor does the organization of such examples in the specification relate to a showing of the superiority and inferiority of the invention. Although the embodiments of the present inventions have been described in detail, it should be understood that various changes, substitutions, and alterations could be made hereto without departing from the spirit and scope of the invention.

What is claimed is:

1. A radio communication apparatus that receives a first signal of a first communication system to which a first frequency band is allocated and a second signal of a second communication system to which a second frequency band, different from the first frequency band, is allocated, the radio communication apparatus comprising:

a first receiver that processes a first signal of the first frequency band received by a first antenna;

a second receiver that processes a second signal of the second frequency band and a third signal of a third frequency band, adjacent to the second frequency band, received by a second antenna;

an interference estimation unit that estimates an interference component based on a nonlinear distortion component of the second signal of the second frequency band;

an inverter that inverts the interference component estimated by the interference estimation unit into an inverse phase of the interference component; and an adder circuit that adds the inverse phase of the interference component to the first signal of the first frequency band processed by the first receiver, wherein nonlinear distortion is caused in modulation by a transmitting apparatus that transmits the second signal of the second frequency band.

2. The radio communication apparatus according to claim 1, wherein the interference estimation unit corrects the estimated interference component based on a difference between the nonlinear distortion component and a signal component of the third frequency band processed by the second receiver.

3. The radio communication apparatus according to claim 1, wherein the interference estimation unit, using the second signal of the second frequency band received by the second antenna, estimates a distortion coefficient of the second signal of the second frequency band, and using the second signal of the second frequency band received by the first antenna and the distortion coefficient, generates a replica of the interference component used for removing the interference component contained in the first signal of the first frequency band.

4. The radio communication apparatus according to claim 2, wherein the interference estimation unit corrects the estimated interference component so as to minimize the difference, and outputs the corrected interference component as a replica of the interference component used to remove the interference component contained in the first signal of the first frequency band.

5. An interference removing method for a radio communication apparatus that receives a first signal of a first communication system to which a first frequency band is allocated and a second signal of a second communication system to which a second frequency band, different from the first frequency band, is allocated, the interference removing method comprising:

processing, by a first receiver, a first signal of the first frequency band received by a first antenna;

processing, by a second receiver, a second signal of the second frequency band and a third signal of a third frequency band, adjacent to the second frequency band, received by a second antenna;

estimating an interference component based on a nonlinear distortion component of the second signal of the second frequency band;

inverting the estimated interference component into an inverse phase of the interference component; and adding the inverse phase of the interference component to the signal of the first frequency band processed by the first receiver, wherein nonlinear distortion is caused in modulation by a transmitting apparatus that transmits the second signal of the second frequency band.

6. An automotive vehicle including a radio communication apparatus that receives a first signal of a first communication system to which a first frequency band is allocated and a second signal of a second communication system to which a second frequency band, different from the first frequency band, is allocated, the automotive vehicle comprising:

a first receiver that processes a first signal of the first frequency band received by a first antenna;

a second receiver that processes a second signal of the second frequency band and a third signal of a third frequency band, adjacent to the second frequency band, received by a second antenna;

an interference estimation unit that estimates an interference component based on a nonlinear distortion component of the second signal of the second frequency band;

an inverter that inverts the interference component estimated by the interference estimation unit into an inverse phase of the interference component; and an adder circuit that adds the inverse phase of the interference component to the signal of the first frequency band processed by the first receiver, wherein nonlinear distortion is caused in modulation by a transmitting apparatus that transmits the second signal of the second frequency band.

7. The vehicle according to claim 6, wherein the first antenna is installed outside the vehicle and the second antenna is installed inside the vehicle.

8. The vehicle according to claim 7, wherein the first antenna receives the signal of the second frequency band transmitted from the second antenna inside the vehicle and the second antenna receives the signal of the first frequency band transmitted from the first antenna outside the vehicle, respectively.

* * * * *